United States Patent
Brock et al.

(10) Patent No.: US 12,017,525 B2
(45) Date of Patent: Jun. 25, 2024

(54) FUEL CAP

(71) Applicant: Stant USA Corp., Connersville, IN (US)

(72) Inventors: Michael S. Brock, Connersville, IN (US); Lowell R. Bell, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 18/050,440

(22) Filed: Oct. 27, 2022

(65) Prior Publication Data

US 2023/0128430 A1 Apr. 27, 2023

Related U.S. Application Data

(60) Provisional application No. 63/272,644, filed on Oct. 27, 2021.

(51) Int. Cl.
*B60K 15/04* (2006.01)
*B60K 15/035* (2006.01)

(52) U.S. Cl.
CPC .... *B60K 15/0406* (2013.01); *B60K 15/03519* (2013.01); *B60K 2015/0441* (2013.01)

(58) Field of Classification Search
CPC .......... B60K 15/0406; B60K 15/03519; B60K 2015/0441
USPC ..................................................... 220/203.19
See application file for complete search history.

(56) References Cited

U.S. PATENT DOCUMENTS

| | | | |
|---|---|---|---|
| 3,937,358 A * | 2/1976 | Smith | B65D 51/1644 220/203.18 |
| 3,995,657 A * | 12/1976 | Horrey | F16K 24/00 220/303 |
| 4,033,475 A | 7/1977 | Evans | |
| 4,072,245 A | 2/1978 | Sloan, Jr. | |
| 4,091,955 A | 5/1978 | Sloan, Sr. | |
| 4,102,472 A | 7/1978 | Sloan, Jr. | |
| 4,280,347 A | 7/1981 | Evans | |
| 4,497,419 A | 2/1985 | Reitzel | |
| 4,498,493 A | 2/1985 | Harris | |
| 4,666,058 A | 5/1987 | Harris | |
| 4,676,390 A | 6/1987 | Harris | |
| 4,685,584 A | 8/1987 | Harris | |
| 4,716,920 A | 1/1988 | Crute | |
| 4,736,863 A | 4/1988 | Harris | |
| 4,779,755 A | 10/1988 | Harris | |
| 4,787,528 A | 11/1988 | Harris et al. | |
| 4,787,529 A | 11/1988 | Harris | |
| 4,887,733 A | 12/1989 | Harris | |
| 4,913,303 A | 4/1990 | Harris | |
| 5,108,001 A | 4/1992 | Harris | |
| 5,110,003 A | 5/1992 | Macwilliams | |
| 5,183,173 A | 2/1993 | Heckman | |
| 5,361,924 A | 11/1994 | Muller | |
| 5,381,919 A | 1/1995 | Griffin et al. | |

(Continued)

*Primary Examiner* — Mahmoud Gimie
(74) *Attorney, Agent, or Firm* — Barnes & Thornburg LLP (57) ABSTRACT

A fuel cap in accordance with the present disclosure includes a closure body and a valve unit integrated with the valve body. The closure body is adapted to engage a fill neck coupled to a fuel tank. The valve unit is configured to selectively vent excess pressure and/or vacuum developed in the fuel tank through the closure body to manage pressure in the fuel tank.

20 Claims, 7 Drawing Sheets

(56) References Cited

U.S. PATENT DOCUMENTS

| | | |
|---|---|---|
| 5,385,256 A | 1/1995 | Brown |
| 5,395,004 A | 3/1995 | Griffin et al. |
| 5,480,055 A | 1/1996 | Harris et al. |
| 5,529,201 A | 6/1996 | Tallent et al. |
| 5,540,347 A | 7/1996 | Griffin |
| 5,638,975 A | 6/1997 | Harris |
| 5,791,507 A | 8/1998 | Harris et al. |
| 5,794,806 A | 8/1998 | Harris et al. |
| 5,829,620 A | 11/1998 | Harris et al. |
| 6,026,848 A | 2/2000 | Huynh |
| 6,079,584 A | 6/2000 | Griffin |
| 6,095,363 A | 8/2000 | Harris et al. |
| RE36,959 E | 11/2000 | Griffin |
| 6,230,918 B1 | 5/2001 | Huynh et al. |
| 6,286,704 B1 | 9/2001 | Harris |
| 6,325,233 B1 | 12/2001 | Harris |
| 6,371,325 B1 | 4/2002 | Ingram |
| 6,561,211 B2 | 5/2003 | Devall |
| 6,739,472 B2 | 5/2004 | Newport |
| 6,763,966 B2 | 7/2004 | Harris |
| 7,131,469 B2 | 11/2006 | Dunkle |
| 7,261,093 B2 | 8/2007 | Groom et al. |
| 7,654,403 B2 | 2/2010 | Decapua et al. |
| 8,567,628 B2 | 10/2013 | Dunkle et al. |
| 8,740,002 B2 | 6/2014 | Ripberger, Jr. et al. |
| 9,527,380 B2 | 12/2016 | Frank et al. |
| 9,688,135 B2 | 6/2017 | Dunkle |
| 2007/0137730 A1 | 6/2007 | Decapua et al. |

* cited by examiner

FUEL CAP

PRIORITY CLAIM

This application claims priority under 35 U.S.C. § 119(e) to U.S. Provisional Application Ser. No. 63/272,644, filed Oct. 27, 2022, which is expressly incorporated by reference herein.

BACKGROUND

The present disclosure relates to fuel caps for closing vehicle fuel tanks. More specifically, the present disclosure relates to fuel caps having pressure-relief valves for releasing excess pressure that can develop in a vehicle fuel tank.

SUMMARY

A fuel cap in accordance with the present disclosure includes a closure body and a valve unit integrated with the valve body. The closure body is adapted to engage a fill neck coupled to a fuel tank. The valve unit is configured to selectively vent excess pressure developed in the fuel tank through the closure body to manage pressure in the fuel tank.

In illustrative embodiments, the fuel cap further includes a valve unit controller that switches the valve unit between a storage mode and a use mode. In the storage mode, the valve unit is disabled from venting excess pressure developed in the fuel tank through the closure body. In the use mode, the valve unit in enabled to vent excess pressure developed in the fuel tank through the closure body.

In illustrative embodiments, the valve unit includes both a pressure-relief valve member and a vacuum-relief valve member. The pressure-relief valve member mounted to move against a bias spring to an open position upon pressure in the fuel tank exceeding atmospheric pressure when the valve unit is in the use configuration. The vacuum-relief valve member mounted to move against a bias spring to an open position upon pressure in the fuel tank falling below atmospheric pressure when the valve unit is in the storage configuration or the use configuration.

In illustrative embodiments, the valve-unit controller includes a mode selector moveable relative to the closure body from a closed position, associated with the storage mode of the valve unit, to an open position, associated with the use mode of the valve unit. The mode selector is configured to block motion of the pressure-relief valve member to the opened position when the mode selector is in the closed position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a fuel cap adapted to close a fill neck connected to a vehicle fuel tank, the fuel cap cut away to show that the fuel cap includes a grip shell adapted to be held and rotated by a user to remove or install the fuel cap onto the fill neck; a fill neck closure that engages the fill neck when the fuel cap is installed on the fill neck; a valve unit mounted in the fill neck closure and configured to provide pressure-relief flow out of the vehicle fuel tank in the case of excess pressure in the vehicle fuel tank or vacuum-relief flow into the vehicle fuel tank in the case of relative negative pressure in the vehicle fuel tank; and a valve-unit controller configured to switch the valve unit from a storage mode, in which pressure-relief flow out of the vehicle fuel tank is disabled so that fuel vapor is not discharged into the atmosphere outside the vehicle fuel tank to avoid buildup of fuel vapor in a storage space, to a use mode, in which pressure-relief flow out of the vehicle fuel tank is enabled so that fuel vapor may be discharged into the atmosphere outside the vehicle fuel tank to avoid excess pressure in the vehicle fuel tank when fuel is being drawn from the vehicle fuel tank to propel a vehicle;

FIG. 5 is an exploded perspective assembly view of the fuel cap of FIGS. 1-4 showing that the fuel cap includes (from bottom to top) the fill neck closure made up of a fill neck seal and closure body; the valve unit having a vacuum-relief bias spring, a vacuum-relief valve member, a pressure-relief valve member, a pressure-relief valve spring guide, a pressure-relief valve spring, and a valve unit retainer for holding other components of the valve unit in the closure body of the fill neck closure; a take-up spring that interfaces between the pressure-relief spring guide and the mode selector of the valve unit controller; a mode-selector retainer; the grip shell into which the valve-unit controller is mounted; a mode-selector O-ring; and the mode selector of the valve unit controller that rotates relative to the grip shell to switch the valve unit from the storage mode shown in FIGS. 1, 2, and 6 to the use mode shown in FIGS. 3, 4, and 7;

DETAILED DESCRIPTION

Figure 1:
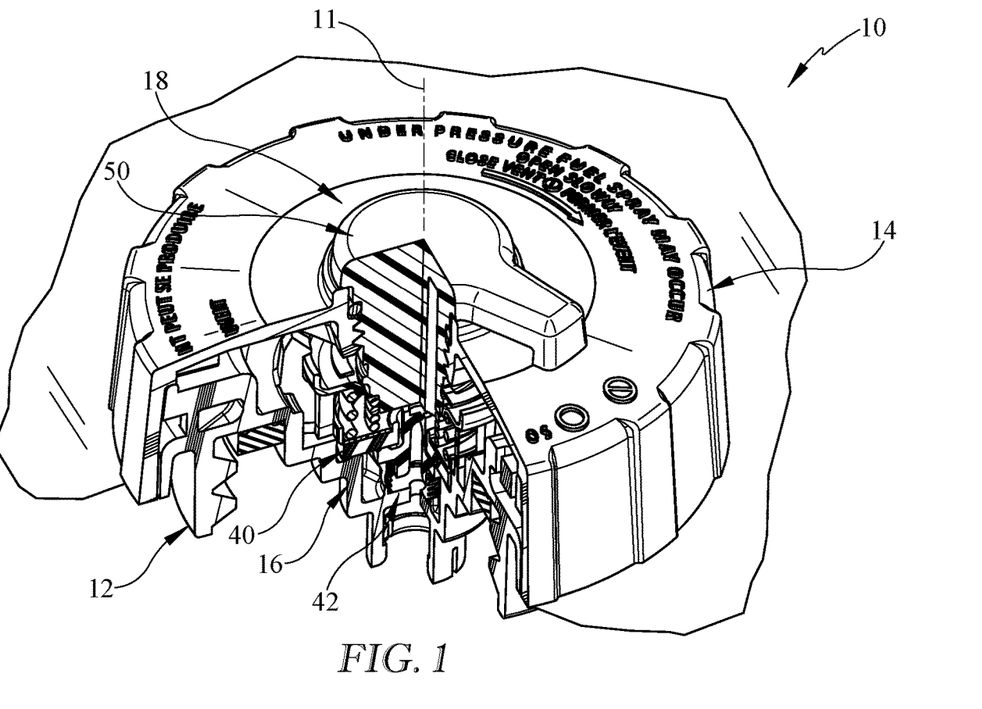
Figure 3:
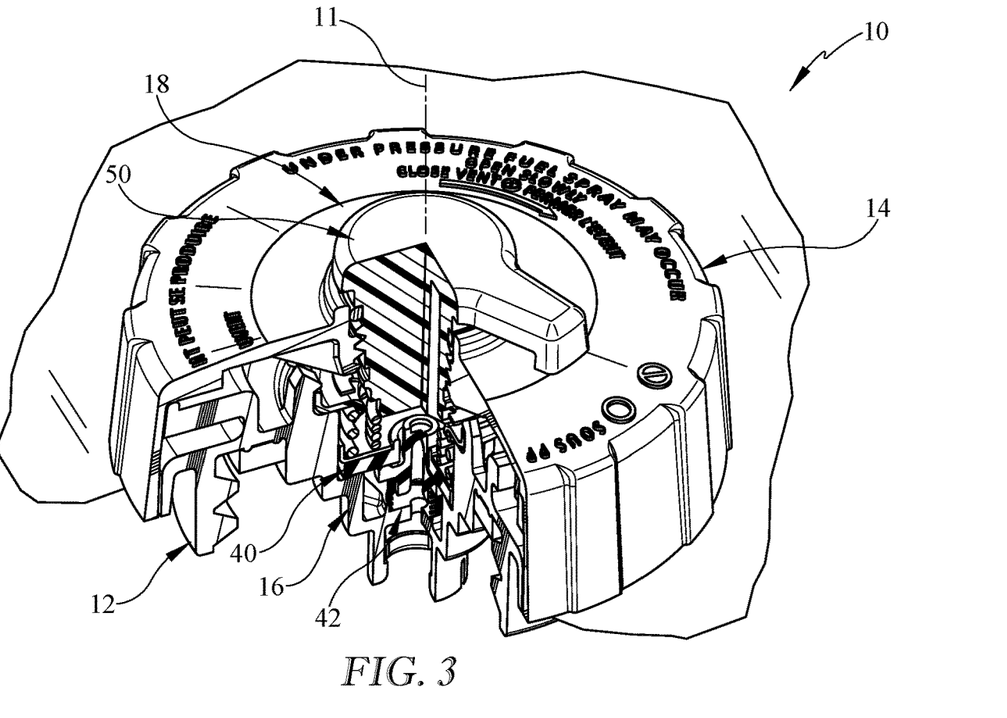
FIG. 3 is a perspective view of the fuel cap of FIGS. 1 and 2 cut away to show that the valve unit has been switched to the use mode, in which pressure-relief flow out of the vehicle fuel tank is enabled, by rotation of the mode selector about the central axis of the fuel cap as suggested in FIG. 4.
Figure 4:
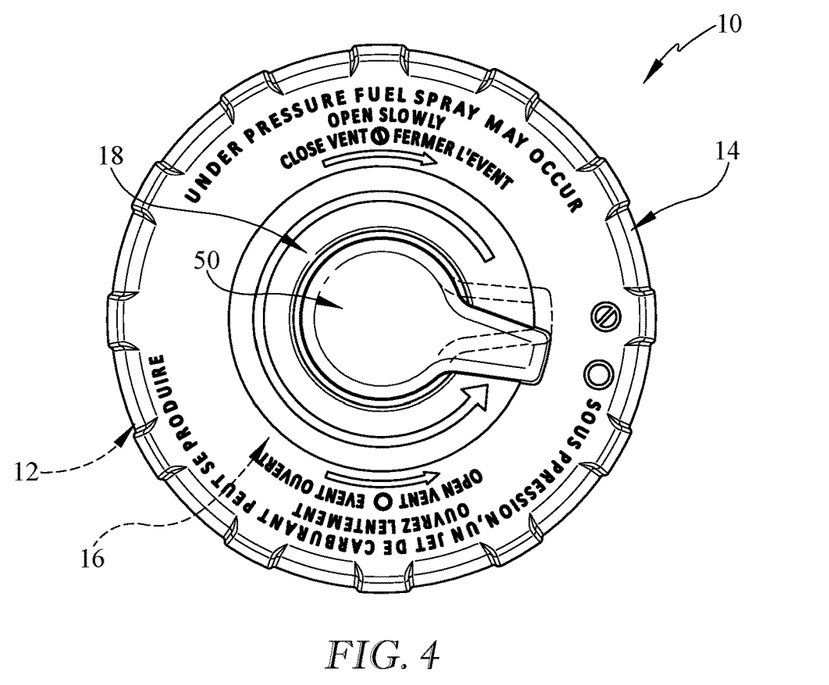
FIG. 4 is a top plan view of the fuel cap of FIG. 3 with the valve unit in the use mode and showing that the mode selector included in the valve unit controller has been rotated relative to the grip shell of the fuel cap about the central axis of the fuel cap to switch the valve unit from the storage mode shown in FIGS. 1 and 2 to the use mode shown in FIGS. 3 and 7.
Figure 5:
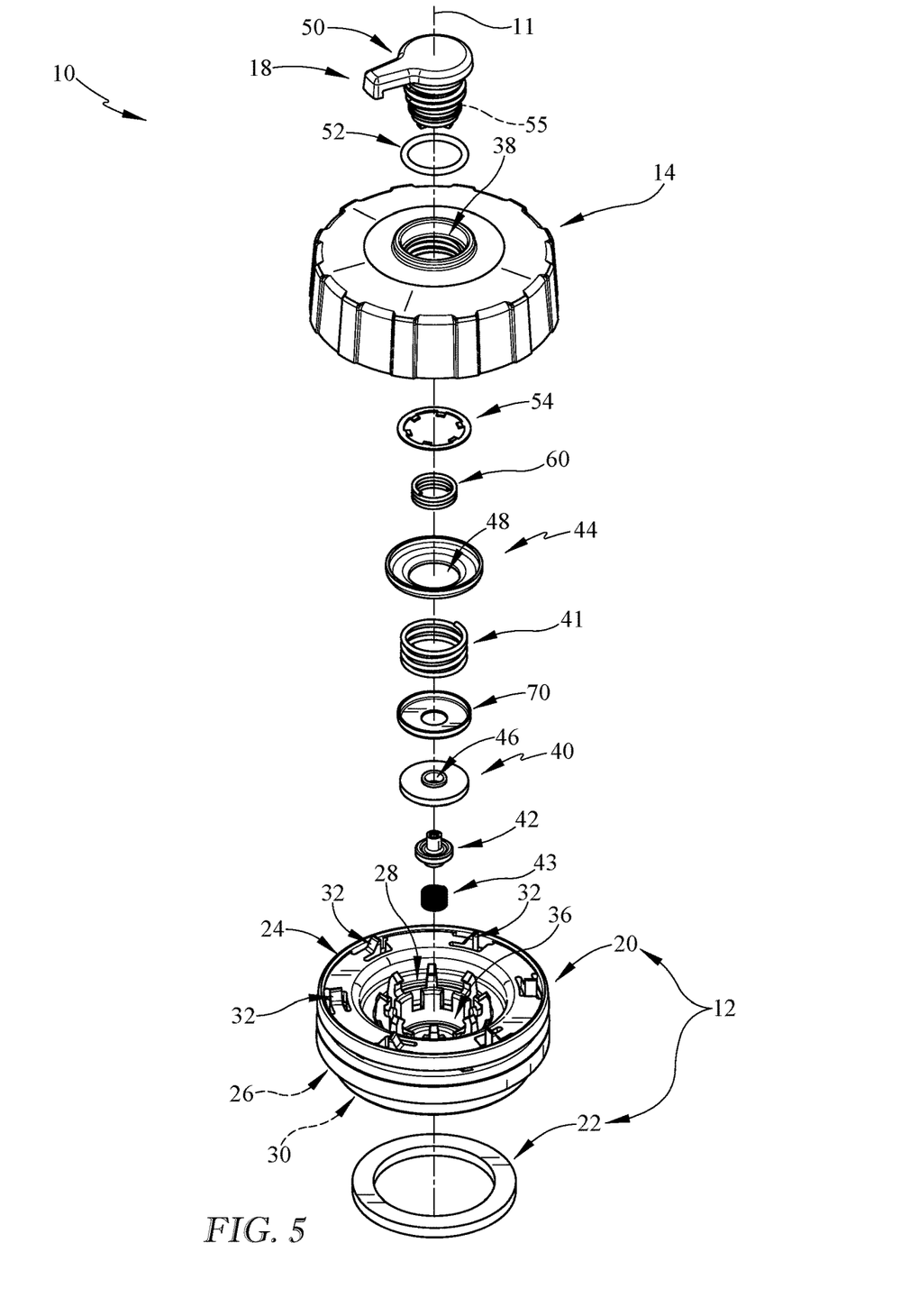

A fuel cap 10 adapted to close a fill neck connected to a vehicle fuel tank is shown in FIG. 1. The fuel cap 10 includes a fill neck closure 12, a grip shell 14, a valve unit 16, and a valve-unit mode controller 18 as shown in FIG. 5. The fill neck closure 12 is configured to engage the fill neck when the fuel cap 10 is installed on the fill neck. The grip shell 14 provides a hand grip for a user installing or removing the fill neck closure 12 from the fill neck. The valve unit 16 is mounted in the fill neck closure 12 and selectively allows flow through the fuel cap 10 to manage pressure in the fill neck and the fuel tank when the fuel tank is closed off by the fuel cap 10. The valve-unit mode controller 18 toggles the valve unit 16 between a storage mode shown in FIGS. 1, 2, and 6 and a use mode shown in FIGS. 3, 4, and 7.

Figure 6:
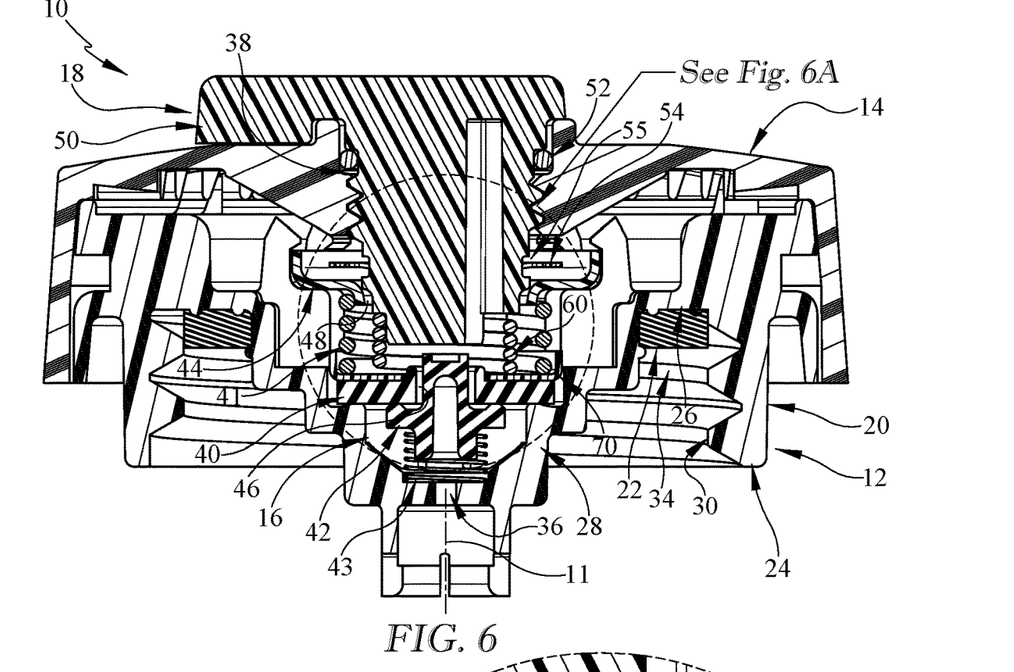
FIG. 6 is a cross-sectional view of the fuel cap of FIGS. 1 and 2 showing the valve unit in the storage mode, in which pressure-relief flow out of the vehicle fuel tank is disabled so that fuel vapor is not discharged into the atmosphere outside the vehicle fuel tank to avoid buildup of fuel vapor in a storage space.

The fill neck closure 12 includes a closure body 20 and a filler neck seal 22 as shown in FIGS. 5 and 6. The closure body 20 is formed to include a rim 24, a seal receiver 26, and a valve cup 28 each arranged around a central axis 11 of the fuel cap 10. The rim 24 is shaped to have threads 30 that engage the fill neck and torque ramps 32 that cooperate with grip shell 12 to discourage excess torque being applied to the fuel cap 10 that can degrade fill neck seal 22. More specifically, the torque ramps 32 are shaped to bend up when torque is developed over a preselected level between the grip shell 14 and the closure body 20 to avoid excess torque being applied to the interface between the closure body and the fill neck. This protects the filler neck seal 22 of the fill neck closure 12. The seal receiver 26 is arranged radially inward of the rim 24 and defines a seal channel 34 sized to receive the fill neck seal 22. The valve cup 28 is arranged radially inward of the seal channel 34 and is shaped to receive the valve unit 16. The valve cup 28 defines a valve passage 36 located along the central axis 11 of the fuel cap 10 through which fuel vapor and/or atmospheric air selectively pass to manage pressure in the fill neck and the fuel tank when the fuel tank is closed off by the fuel cap 10.

The grip shell 14 is adapted to be held and rotated by a user to remove or install the fuel cap 10 onto the fill neck as suggested in FIGS. 1 and 5. The grip shell 14 is coupled to the fill neck closure 12 to transmit torque to the fill neck closure 12 via torque ramps 32. The grip shell 14 is formed to define a controller-mount opening 38 located along the central axis 11 in which the valve-unit controller 18 is mounted.

The valve unit 16 is illustratively includes a pressure-relief valve member 40, a vacuum-relief valve member 42, and a valve retainer 44 as shown in FIG. 5. The pressure-relief valve member 40 is movable against the bias of a pressure-relief bias spring 41 along the axis 11 to open the valve passage 36 through the fill neck closure 12. The pressure-relief valve member 40 is formed to include a vacuum passage 46 that is coaxial with the valve passage 36. The vacuum-relief valve 42 is movable against the bias of a vacuum-relief bias spring 43 along the axis 11 to open the vacuum passage 46 through the pressure-relief valve member 40. The valve retainer 44 fits over the valve cup 28 of the closure body 20 to hold the relief valve members 40, 42 in place and is formed to include a selector passage 48 that is coaxial with the valve passage 36.

The valve-unit controller 18 is configured to switch the valve unit 16 between the storage mode and the use mode as suggested in FIGS. 1-2 and 3-4. The valve-unit controller 18 illustratively includes a mode selector 50, an O-ring seal 52, and a selector retainer 54 as shown in FIG. 5. The mode selector 50 is coupled to the grip shell 14 via threads formed in the controller-mount opening 38 to allow for rotation of the mode selector 50 relative to the grip shell 14 about the axis 11. The O-ring seal 52 seals between the mode selector 50 and the grip shell 14 so as to discourage fuel vapor from discharging through the controller-mount opening 38 toward a user during opening of the mode selector 50. The selector retainer 54 interfaces with a shank 55 of the mode selector 50 and is configured to block movement of the mode selector outward along the axis 11 beyond a preselected opened position.

Figure 2:
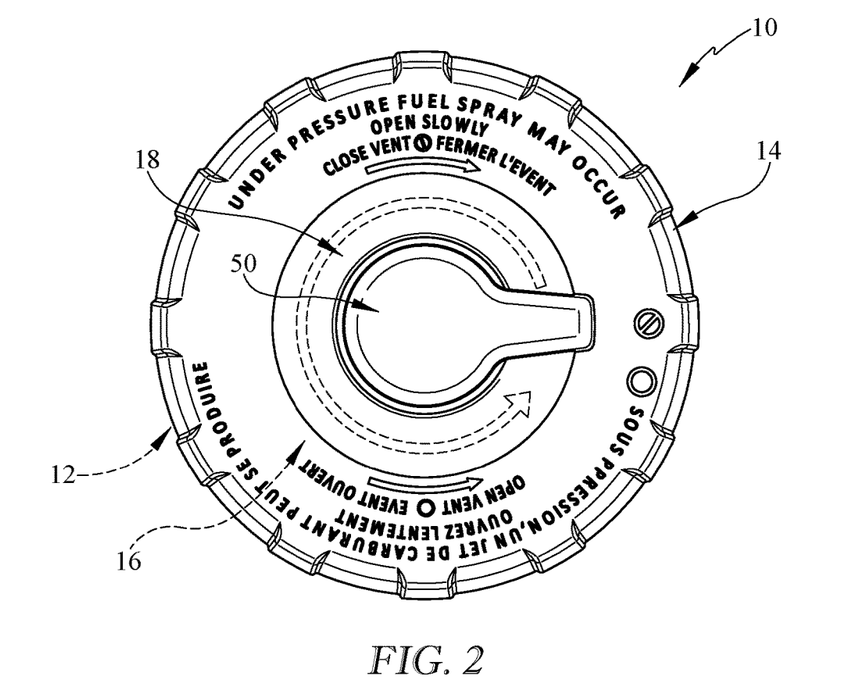
FIG. 2 is a top plan view of the fuel cap of FIG. 1 with the valve unit in the storage mode and suggesting that a mode selector included in the valve unit controller may be rotated relative to the grip shell of the fuel cap about a central axis of the fuel cap to switch the valve unit from the storage mode shown in FIGS. 1, 2, and 6 to the use mode shown in FIGS. 3, 4, and 7.

The mode selector 50 can be rotated to screw the selector 50 inwardly toward a closed position thereby selecting the storage configuration of the valve unit 16 as suggested in FIGS. 1, 2, and 6. Conversely, the mode selector 50 can be rotated to screw the selector 50 outwardly toward an opened position thereby selecting the use configuration of the valve unit 16 as suggested in FIGS. 3, 4, and 7. In operation, the a valve-unit controller 18 is configured to switch the valve unit 16 from the storage mode to the use mode upon rotation of the mode selector 50 to the open position as suggested in FIGS. 3, 4, and 7.

Figure 6A:
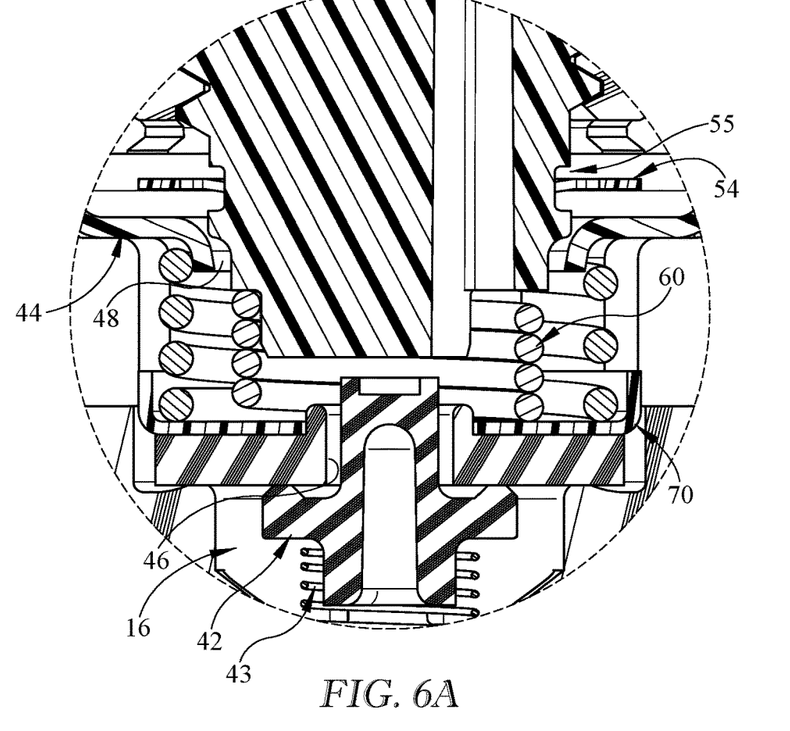
FIG. 6A is a detail view of the valve unit in FIG. 6 showing the mode selector of the valve unit pressing the take-up spring into a fully compressed position against the pressure-relief spring guide and pressure-relief valve member to block the pressure-relief valve member from opening so that fuel vapor is not discharged into the atmosphere outside the vehicle fuel tank to avoid buildup of fuel vapor in a storage space.

In the storage mode, pressure-relief flow out of the vehicle fuel tank is disabled so that fuel vapor is not discharged into the atmosphere outside the vehicle fuel tank to avoid buildup of fuel vapor in a storage space as shown in FIGS. 6 and 6A. Further, in the storage configuration, the mode selector 50 of the valve-control unit presses a take-up spring 60 into a fully compressed position against a pressure-relief spring guide 70 and the pressure-relief valve member 40. Thus, the mode selector 50 blocks the pressure-relief valve member 40 from opening so that fuel vapor is not discharged into the atmosphere outside the vehicle fuel tank. Disabling discharge of fuel vapor can prevent buildup of fuel vapor in a storage space, a transportation space, or other places the fuel cap 10 may be used that are unsuitable for fuel vapors.

Figure 7:
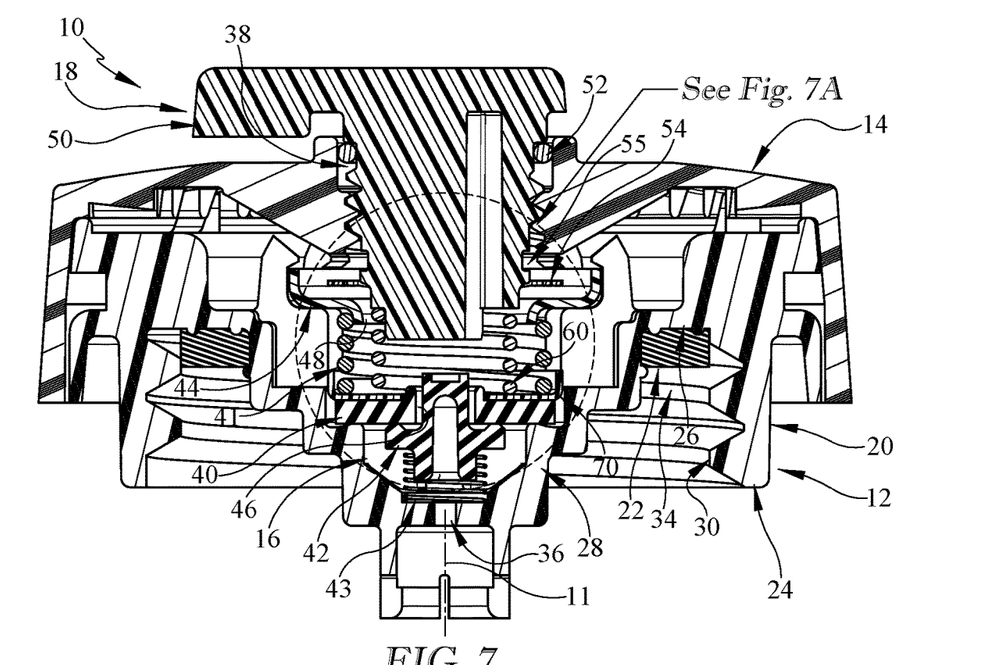
FIG. 7 is a cross-sectional view of the fuel cap of FIGS. 3 and 4 showing the valve unit in the use mode, in which pressure-relief flow out of the vehicle fuel tank is enabled so that fuel vapor may be discharged into the atmosphere outside the vehicle fuel tank to avoid excess pressure in the vehicle fuel tank when fuel is being drawn from the vehicle fuel tank to propel a vehicle as shown in FIG. 8.
Figure 7A:
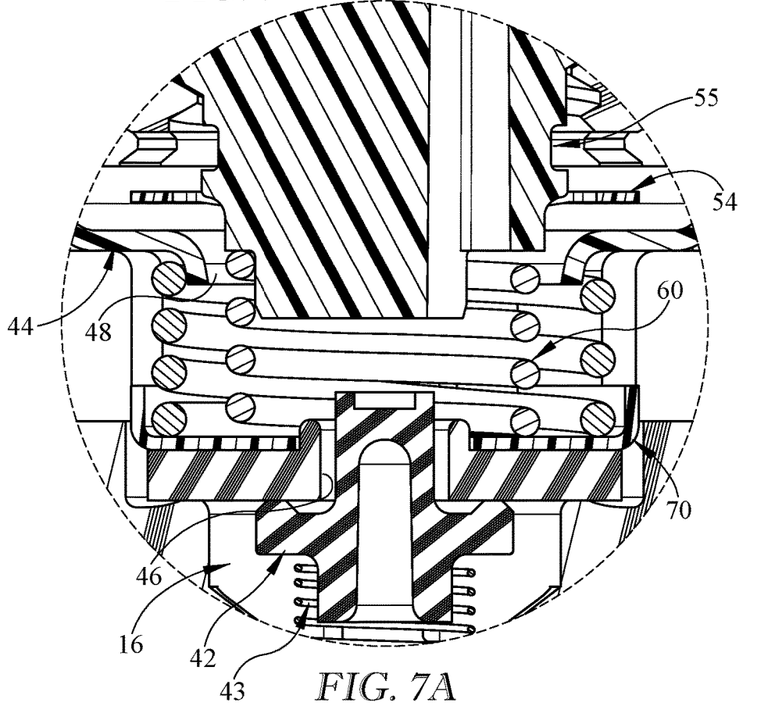
FIG. 7A is a detail view of the valve unit in FIG. 7 showing the mode selector of the valve unit releasing the take-up spring into an expanded position reducing resistance on the pressure-relief spring guide and pressure-relief valve member to allow the pressure-relief valve member to open upon pressure in the fuel tank exceeding a predetermined level large enough to overcome the bias force of the pressure-relief valve spring and expanded take-up spring so that fuel vapor may be discharged into the atmosphere outside the vehicle fuel tank to avoid excess pressure in the vehicle fuel tank when fuel is being drawn from the vehicle fuel tank to propel a vehicle as suggested in FIG. 8.
Figure 8:
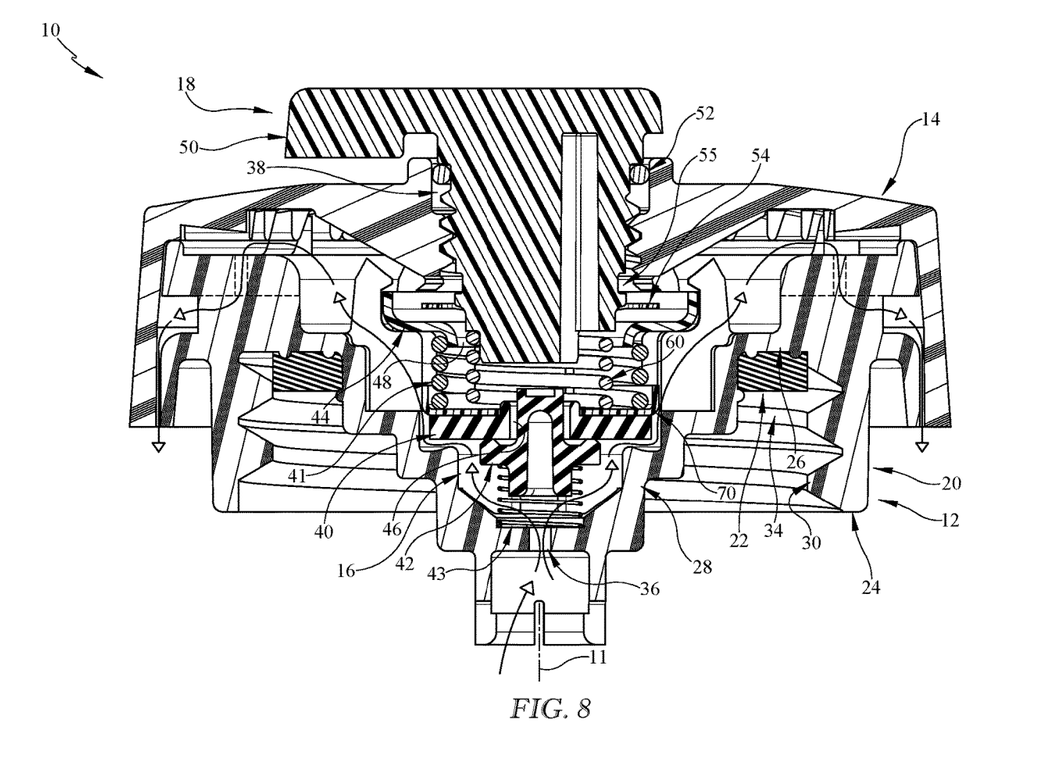
FIG. 8 is a cross-sectional view of the fuel cap showing the valve unit in the use mode with the pressure-relief valve member of the valve unit opened by pressure in the associated vehicle fuel tank to allow a flow of fuel vapor to move through the fuel cap and out to atmosphere.

In the use mode, pressure-relief flow out of the vehicle fuel tank is enabled so that fuel vapor may be discharged into the atmosphere outside the vehicle fuel tank to avoid excess pressure in the vehicle fuel tank as shown in FIGS. 7, 7A, and 8. In the use mode, the mode selector 50 releases the take-up spring 60 into an expanded position reducing resistance on the pressure-relief spring guide 70 and pressure-relief valve member 40. In this way, the pressure-relief valve member 40 is allowed to open upon pressure in the fuel tank exceeding a predetermined level large enough to overcome the bias force of the pressure-relief valve spring 41 and expanded take-up spring 60 so that fuel vapor may be discharged into the atmosphere outside the vehicle fuel tank as suggested in FIG. 8.

Figure 9:
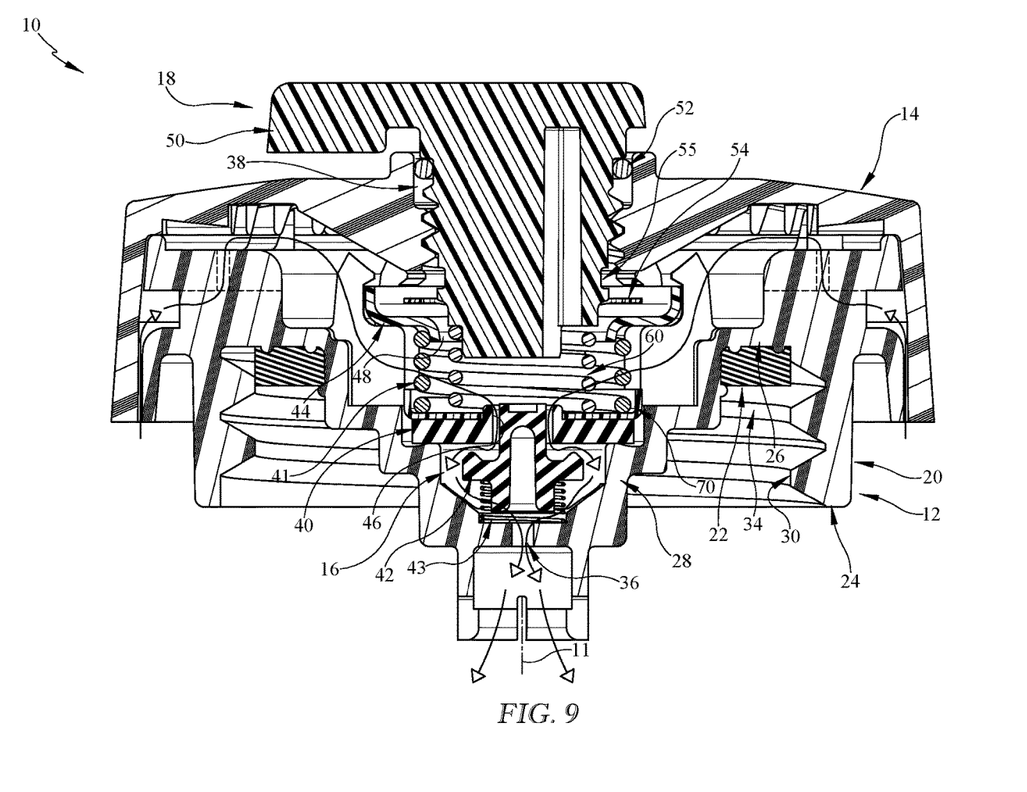
FIG. 9 is a cross-sectional view of the fuel cap showing the valve unit in the use mode with the vacuum-relief valve member of the valve unit opened by relative negative pressure in the associated vehicle fuel tank to allow a vacuum flow of atmospheric air to move through the fuel cap and into the fuel tank.

In either the storage mode or use mode, vacuum-relief flow into the vehicle fuel tank via the vacuum-relief valve member 42 of the valve unit 16 is enabled as suggested in FIG. 9. In this way, atmospheric air is allowed into the vehicle fuel tank to avoid excess negative relative pressure from building up in the vehicle fuel tank either during storage or use of the fuel cap 10. The vacuum-relief valve member 42 moves from a normally closed position to an opened position when negative pressure below surrounding atmospheric pressure in the vehicle fuel tank overcomes the vacuum-relief valve spring 43 as shown in FIG. 9. However, vacuum-relief flow may be restricted during storage mode since the compressed pressure-relief valve spring and take-up spring are compressed reducing or eliminating gaps therethrough. This feature can be helpful to users who operate a vehicle associated with the fuel cap 10 after forgetting to move the mode selector 50 to the opened position since use of fuel from the vehicle fuel tank by an engine will drive the development of negative pressure in the vehicle fuel tank. If vacuum relief were not enabled, the engine would eventually be starved of fuel and would shut down.

In other embodiments, the vacuum-relief valve member of the valve unit may be disabled during storage mode. This can be accomplished via complete sealing through the surrounding springs 41, 60, via sealing attachments to the mode selector 50, or in other suitable ways as would be known in the art.

The fuel cap 10 of the present disclosure is suitable for use in many applications and systems. For example, the fuel cap 10 may be used with an outboard or removable vehicle engine like a marine outboard engine that is regularly stored for long periods of time. The fuel cap 10 may of course also be used with other vehicles and even in non-vehicle applications and systems in which a reconfigurable integrated valve unit is desired.

The invention claimed is:

1. A fuel cap for use with a fill neck of a vehicle fuel tank, the fuel cap comprising
   a closure body adapted to engage the fill neck of the fuel tank,
   a valve unit configured to selectively vent excess pressure developed in the fuel tank through the closure body to manage pressure in the fuel tank, and
   valve-unit control means for switching the valve unit between a storage mode and a use mode, wherein in the storage mode the valve unit is disabled from venting excess pressure developed in the fuel tank through the closure body, and wherein in the use mode the valve unit in enabled to vent excess pressure developed in the fuel tank through the closure body,
   wherein the valve unit includes a pressure-relief valve member and a vacuum-relief valve member, wherein the pressure-relief valve member is mounted to move against a bias spring to an open position upon pressure in the fuel tank exceeding atmospheric pressure by a preset amount when the valve unit is in the use configuration, and wherein the vacuum-relief valve member mounted to move against a bias spring to an open position upon pressure in the fuel tank falling below atmospheric pressure when the valve unit is in the storage configuration or the use configuration.

2. The fuel cap of claim 1, wherein, the valve-unit controller includes a mode selector moveable relative to the closure body from a closed position, associated with the storage mode of the valve unit, to an open position, associated with the use mode of the valve unit.

3. The fuel cap of claim 2, wherein the mode selector is configured to block motion of the pressure-relief valve member to the opened position when the mode selector is in the closed position.

4. A fuel cap for use with a fill neck of a vehicle fuel tank, the fuel cap comprising
   a closure body adapted to engage the fill neck of the fuel tank,
   a valve unit configured to selectively vent excess pressure developed in the fuel tank through the closure body to manage pressure in the fuel tank, wherein the valve unit includes a pressure-relief valve member and a vacuum-relief valve member, wherein the pressure-relief valve member is mounted to move against a bias spring to an open position upon pressure in the fuel tank exceeding atmospheric pressure by a preset amount when the valve unit is in the use configuration, and wherein the vacuum-relief valve member mounted to move against a bias spring to an open position upon pressure in the fuel tank falling below atmospheric pressure when the valve unit is in the storage configuration or the use configuration, and
   valve-unit controller including a mode selector moveable relative to the closure body between (a) a closed position that sets arrangement of the valve unit to a storage mode in which the valve unit is disabled from venting excess pressure developed in the fuel tank through the closure body and (b) an open position that sets arrangement of the valve unit to a use mode in which the valve unit in enabled to vent excess pressure developed in the fuel tank through the closure body.

5. The fuel cap of claim 4, wherein the pressure-relief valve member is mounted to move along an axis from a closed position to the opened position and the vacuum-relief valve is mounted to move along the axis from a closed position to the opened position.

6. The fuel cap of claim 5, wherein the mode selector is rotatable about the axis to move between its closed position and the opened position.

7. The fuel cap of claim 4, further comprising a grip shell sized to be held and rotated by a hand of a user to remove or install the fuel cap onto the fill neck, the grip shell coupled to the closure body to transmit torque to the closure body upon rotation about an axis.

8. The fuel cap of claim 7, wherein torque ramps selectively transmit torque from the grip shell to the closure body up to a preselected level to discourage excess torque being applied to the interface between the closure body and the fill neck.

9. The fuel cap of claim 7, A fuel cap for use with a fill neck of a vehicle fuel tank, the fuel cap comprising
   a closure body adapted to engage the fill neck of the fuel tank,
   a valve unit configured to selectively vent excess pressure developed in the fuel tank through the closure body to manage pressure in the fuel tank,
   valve-unit controller including a mode selector moveable relative to the closure body between (a) a closed position that sets arrangement of the valve unit to a storage mode in which the valve unit is disabled from venting excess pressure developed in the fuel tank through the closure body and (b) an open position that sets arrangement of the valve unit to a use mode in which the valve unit in enabled to vent excess pressure developed in the fuel tank through the closure body, and a grip shell sized to be held and rotated by a hand of a user to remove or install the fuel cap onto the fill neck, the grip shell coupled to the closure body to transmit torque to the closure body upon rotation about an axis, wherein the grip shell defines a controller-mount opening in which the mode selector is mounted.

10. The fuel cap of claim 9, wherein the controller mount opening is arranged along an axis and the mode selector of the valve-unit controller is rotatable about the axis to move between the closed position and the opened position.

11. The fuel cap of claim 10, wherein the valve unit includes a pressure-relief valve member mounted to move along the axis from a closed position to an opened position.

12. The fuel cap of claim 11, wherein the pressure-relief valve member is encouraged toward the closed position by a bias spring when the mode selector is in the open position, and wherein the mode selector is configured to block motion of the pressure-relief valve member to the opened position by fully compressing the bias spring when the mode selector is in the closed position.

13. The fuel cap of claim 10, wherein the valve unit includes a vacuum-relief valve mounted to move along the axis from a closed position to an opened position.

14. The fuel cap of claim 4, further comprising a grip shell coupled to the closure body to selectively transmit torque to the closure body upon rotation about an axis, wherein the grip shell defines a controller-mount opening in which the mode selector is mounted.

15. The fuel cap of claim 9, wherein torque ramps selectively transmit torque from the grip shell to the closure body up to a preselected level.

16. A fuel cap for use with a fill neck of a vehicle fuel tank, the fuel cap comprising a closure body adapted to engage the fill neck of the fuel tank, a valve unit configured to selectively vent excess pressure developed in the fuel tank through the closure body to manage pressure in the fuel tank, the valve unit including a pressure-relief valve member mounted to move against a bias spring from a normally closed position to an open position upon pressure in the fuel tank exceeding atmospheric pressure by a preset amount and a vacuum-relief valve member mounted to move against a bias spring from a normally closed position to an open position upon pressure in the fuel tank falling below atmospheric pressure, and valve-unit controller including a mode selector moveable relative to the closure body between (a) a closed position that sets arrangement of the valve unit to a storage mode in which the a spring between the mode selector and the pressure-relief valve is fully compressed to block movement of the pressure-relief valve member away from the closed position, and (b) an open position that sets arrangement of the valve unit to a use mode in which the bias spring of the pressure-relief valve member is decompressed to a preset length configured to allow movement of the pressure-relief valve member away from the closed position in response to upon pressure in the fuel tank exceeding atmospheric pressure by the preset amount.

17. The fuel cap of claim 16, wherein the pressure-relief valve is mounted for movement along an axis during motion from the closed position to the opened position, and wherein the mode selector is mounted for rotation about the axis during motion from the closed position to the opened position.

18. The fuel cap of claim 17, wherein the vacuum-relief valve is mounted for movement along the axis for movement along the axis during motion from the closed position to the opened position.

19. The fuel cap of claim 16, wherein a take-up spring independent of the bias spring associated with the pressure-relief valve member provides the spring between the mode selector and the pressure-relief valve that is fully compressed to block movement of the pressure-relief valve member away from the closed position.

20. The fuel cap of claim 19, wherein the take-up spring is coaxial with the bias spring associated with the pressure-relief valve member.

* * * * *